(12) United States Patent
Cho et al.

(10) Patent No.: US 10,176,261 B2
(45) Date of Patent: Jan. 8, 2019

(54) KEYWORD PRESENTING SYSTEM AND METHOD BASED ON SEMANTIC DEPTH STRUCTURE

(71) Applicant: NAVER CORPORATION, Gyeonggi-do, Seongnam-si (KR)

(72) Inventors: Min Kyung Cho, Seongnam-si (KR); Hee Sung Lee, Seongnam-si (KR); Mi Seung Yang, Seongnam-si (KR); Jin Hwan Yoo, Seongnam-si (KR); Tae Il Kim, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 620 days.

(21) Appl. No.: 14/466,679

(22) Filed: Aug. 22, 2014

(65) Prior Publication Data
US 2015/0058309 A1    Feb. 26, 2015

(30) Foreign Application Priority Data

Aug. 23, 2013 (KR) ........................ 10-2013-0100560

(51) Int. Cl.
*G06F 17/30* (2006.01)

(52) U.S. Cl.
CPC .... *G06F 17/30867* (2013.01); *G06F 17/3064* (2013.01)

(58) Field of Classification Search
CPC ........... G06F 17/2785; G06F 17/30277; G06F 17/3064
See application file for complete search history.

(56) References Cited

U.S. PATENT DOCUMENTS

| 4,775,956 A | * | 10/1988 | Kaji | .................. G06F 17/30955 704/1 |
| 5,551,049 A | * | 8/1996 | Kaplan | ............... G06F 17/2795 715/205 |

(Continued)

FOREIGN PATENT DOCUMENTS

| JP | 1997-044506 A | 2/1997 |
| JP | 2002-032394 A | 1/2002 |

(Continued)

OTHER PUBLICATIONS

Chen et al., "Advertising Keyword Suggestion Based on Concept Hierarchy", 2008, ACM.*

(Continued)

*Primary Examiner* — Apu M Mofiz
*Assistant Examiner* — Sheryl L Holland
(74) *Attorney, Agent, or Firm* — Greer, Burns & Crain, Ltd.

(57) ABSTRACT

Provided is a keyword presenting system based on a sematic depth structure, including: a communication unit connected with a client via a network; an interface unit configured to receive keyword information inputted from the client and to provide a search interface presenting multiple candidate keywords; a search database configured to save multiple search results and multiple candidate keywords constituting the search interface; a semantic depth database configured to save a semantic depth structure representing a semantic distance between keywords for each candidate keyword; and a semantic depth engine configured to derive multiple associated keywords based on the search database regarding the keyword inputted from the client, and to support a function of gradationally presenting recommended keyword lists for each semantic depth level according to the selection of a user by forming recommended keyword groups for each seman- (Continued)

tic depth level based on the multiple associated keywords using the semantic depth database.

17 Claims, 10 Drawing Sheets

(56) References Cited

U.S. PATENT DOCUMENTS

| | | | |
|---|---|---|---|
| 6,430,557 B1* | 8/2002 | Gaussier | G06F 17/30672 |
| 7,194,460 B2* | 3/2007 | Komamura | G06F 17/3064 |
| 7,653,530 B2* | 1/2010 | Carter | G06F 17/277 |
| | | | 704/1 |
| 7,756,855 B2* | 7/2010 | Ismalon | G06F 17/3064 |
| | | | 707/713 |
| 8,667,007 B2* | 3/2014 | Tao | G06F 17/3053 |
| | | | 707/769 |
| 8,990,105 B1* | 3/2015 | Shatkin-Margolis | |
| | | | G06Q 30/02 |
| | | | 705/14.25 |
| 9,317,859 B2* | 4/2016 | Yoon | G06Q 30/02 |
| 9,361,640 B1* | 6/2016 | Donsbach | G06Q 30/0625 |
| 2002/0059161 A1* | 5/2002 | Li | G06F 17/30622 |
| 2005/0080775 A1* | 4/2005 | Colledge | G06F 17/30867 |
| 2005/0091191 A1* | 4/2005 | Miller | G06F 17/30722 |
| 2005/0234953 A1* | 10/2005 | Zhang | G06F 17/30663 |
| 2006/0020591 A1* | 1/2006 | Kommers | G06F 17/3097 |
| 2006/0206516 A1* | 9/2006 | Mason | G06Q 30/02 |
| 2007/0016563 A1* | 1/2007 | Omoigui | G06F 17/3061 |
| 2007/0027901 A1* | 2/2007 | Chan | G06Q 30/02 |
| 2009/0171929 A1 | 7/2009 | Jing et al. | |
| 2009/0292677 A1* | 11/2009 | Kim | G06F 17/3089 |
| 2010/0010989 A1* | 1/2010 | Li | G06F 17/30675 |
| | | | 707/E17.017 |
| 2010/0293162 A1* | 11/2010 | Odland | G06F 17/3064 |
| | | | 707/736 |
| 2011/0184926 A1* | 7/2011 | Lee | G06Q 10/00 |
| | | | 707/706 |
| 2011/0257960 A1* | 10/2011 | Sathish | G06Q 10/06 |
| | | | 704/9 |
| 2012/0185486 A1* | 7/2012 | Voigt | H04L 51/32 |
| | | | 707/741 |
| 2012/0290950 A1* | 11/2012 | Rapaport | H04L 51/32 |
| | | | 715/753 |
| 2012/0317101 A1* | 12/2012 | Jones | G06F 17/3064 |
| | | | 707/723 |
| 2014/0164367 A1* | 6/2014 | Lee | G06F 17/3064 |
| | | | 707/723 |
| 2015/0339573 A1* | 11/2015 | Flinn | G06N 5/048 |
| | | | 706/12 |

FOREIGN PATENT DOCUMENTS

| | | |
|---|---|---|
| JP | 2006-190023 A | 7/2006 |
| JP | 2012-150539 A | 8/2012 |
| JP | 2013-507716 A | 3/2013 |
| JP | 2013-510346 A | 3/2013 |
| WO | WO 2009/136426 A1 | 11/2009 |
| WO | WO 2011/046808 A1 | 4/2011 |
| WO | WO 2011/055174 A1 | 5/2011 |

OTHER PUBLICATIONS

Moon et al., Unsupervised Morphological Segmentation and Clustering with Document Boundaries, 2009, ACL and AFNLP.*

Guo et al., "Towards Searching Domain Assets Based on Semantic Similarity", 2011, IEEE.*

Shimaoka et al.; "A Typing-Free Search Engine with a Query-Word Navigation Mechanism for Tablet Terminals"; DEIM Forum 2011; pp. 2-7 (with English Abstract).

* cited by examiner

FIG. 6

-QUERY <tab> CATEGORY 1 | CATEGORY 2 |..
601 { •SEOGWIPO REGION || DOMESTIC REGION
•NAJU-SI REGION || DOMESTIC REGION
•SAMJEON-DONG REGION || DOMESTIC REGION -CATEGORY INFORMATION CHANGE
603 { •CAR || CAR MODEL pft0ky ~ 603a
•CAR || CAR MANUFACTURER pftrdl ~ 603b
•CAR || PETROL STATION/OIL PRICE pftxeb ~ 603c
601~ •REGION || DOMESTIC REGION h55pva
602 { •REGION || FOREIGN REGION || COUNTRY NAME h55vktvzt ~ 602a
•REGION || FOREIGN REGION || GENERAL FOREIGN REGION h55vktbhq ~ 602b FIG. 10
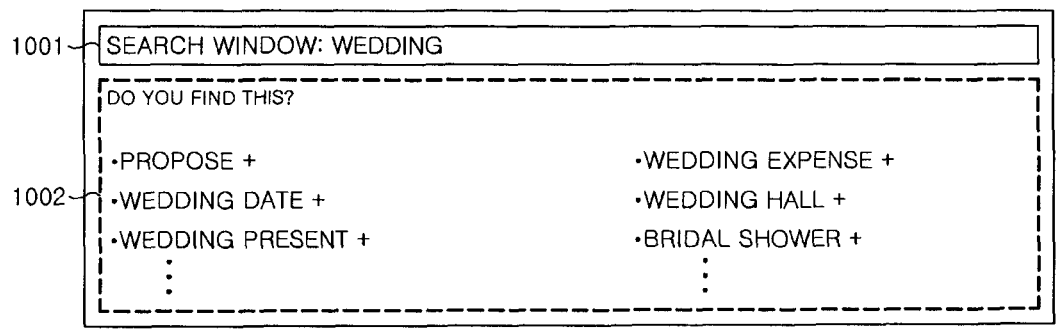
(a)
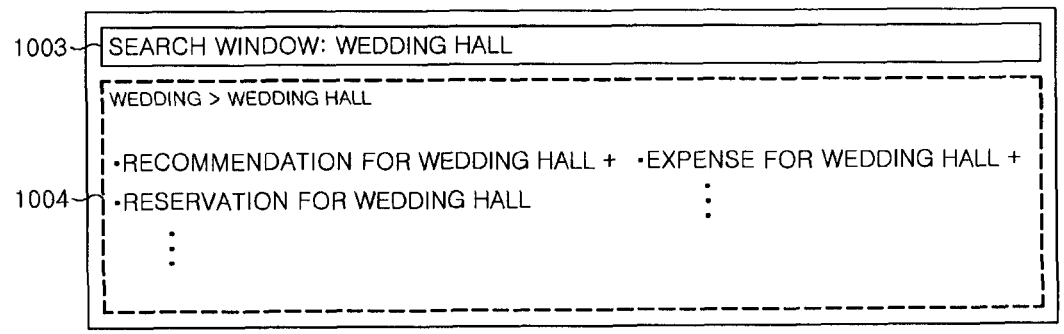
(b)
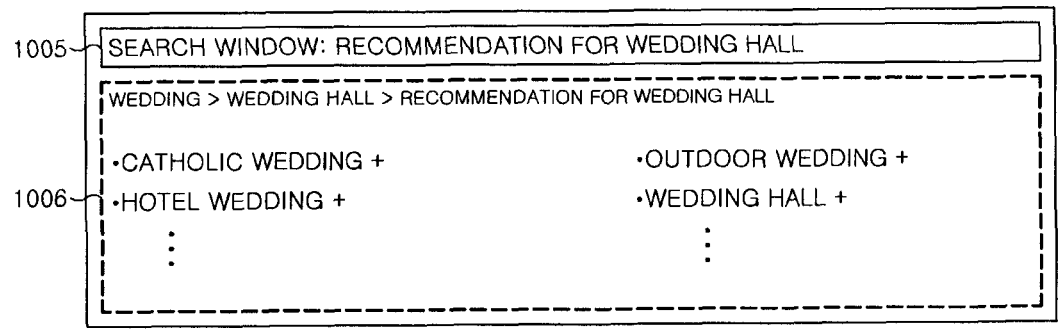
(c)

KEYWORD PRESENTING SYSTEM AND METHOD BASED ON SEMANTIC DEPTH STRUCTURE

BACKGROUND OF THE INVENTION

The present invention relates, in general, to a system and a method for presenting recommended keywords upon using a search service and, more particularly, to a system and a method for gradationally presenting multiple recommended keywords associated with a keyword according to a semantic depth structure with regard to the keyword inputted in a search window upon carrying out a search.

Generally, a search service system intended for providing search services provides a user with search results (for example, websites including a search word, articles including the search word, images having file names including the search word and the like) corresponding to a search word when the search word (or a keyword or a query) is inputted by the user.

In particular, when receiving a search request from the user, recent search service systems carry out an integrated search according to the search request and provides the user with results of the integrated search which are arranged in order of regular search channels.

Also, according to the development of an associated model-based keyword providing technology which provides keywords associated with a keyword inputted by a user as well as information regarding the inputted keyword, as a conventional art, there is a method of providing keywords mainly inputted by users as associated keywords regarding specific keywords which have been inputted by the users. Also, there is a method of providing, as associated keywords, words having high association with keywords inputted by the users after measuring the association between words based on documents present on the web such as webpages and saving the words having a high association with regard to a specific word.

An associated model refers to a modeling data structure based on an associated relation between words, and a representative example thereof is an ontology. Ontology refers to the subject of existence in a specific area of knowledge and a work model of an interaction between objects, and an ontological approach hierarchically expresses words related to a specific domain according to a certain inference rule. That is, the ontology of a word may refer to collection of the concepts of objects, events, relations and the like defined in a specific natural language in order to create vocabularies agreed upon for information interchange. The ontology of a word enables web-based knowledge processing or knowledge sharing and reuse among application programs.

In general, a conventional portal site and a search site have been provided with a keyword presenting function via the auto complete of input keywords in order to provide search convenience. This function is intended to show many keywords containing an inputted keyword via an expanding menu, even when a user inputs only a part of the keyword. The associated keywords are presented in order of similarity and frequency. This function is advantageous in that search users can select their desired keywords from among multiple keywords presented by a search apparatus even though the search users know only a part of the keyword required by each of them, and an input time for the keyword can be reduced, thereby providing the users with search convenience.

However, the first conventional art is intended to simply show user search patterns by simply exposing keywords which have been continuously frequently searched, and the second conventional art is intended to simply provide the user with keywords having a high association with an inputted keyword based on association between words. Thus, these conventional arts only simply provide other keywords related to the keyword inputted by the user and substantially have a limit in providing keywords according to various issues which may be derived from the corresponding keyword.

Also, according to the function of auto complete of the keywords, since only keywords containing a word inputted by the search user are presented, it is problematic in that keywords consistent with a purport of the search intended by the search user are neither secured nor presented when the inputted keyword is different from a keyword having a concept actually required by the search user with respect to the constitution of the word thereof.

SUMMARY OF THE INVENTION

Accordingly, the present invention has been made keeping in mind the above problems occurring in the related art, and an object of the present invention is to provide a system and a method for gradationally presenting recommended keywords semantically associated with a keyword according to a semantic depth structure with regard to the keyword inputted in a search window upon carrying out a search.

Also, another object of the present invention is directed to a system and a method for providing multiple keywords associated with a keyword inputted by a search user as recommended keywords according to each semantic depth level so that the search user can recognize words which he or she may not have normally considered, thereby widening a scope of the search.

The technical problems to be solved by the present invention are not limited to the aforesaid technical problems, and other technical problems which have not been mentioned may be clearly understood by those having ordinary skill in the art to which the present invention pertains.

In order to accomplish the above objects, according to an aspect of an embodiment of the present invention, there is provided a keyword presenting system, which presents multiple keywords associated with a keyword inputted from a client, the system including: a communication unit connected with the client via a network; an interface unit configured to receive keyword information inputted from the client and to provide a search interface presenting multiple candidate keywords; a search database configured to save multiple search results and multiple candidate keywords constituting the search interface; a semantic depth database configured to save a semantic depth structure representing a semantic distance between keywords according to each candidate keyword; and a semantic depth engine configured to derive multiple associated keywords based on the search database with regard to the keyword inputted from the client, and to support a function of gradationally presenting recommended keyword lists for each semantic depth level according to the selection of a user by forming recommended keyword groups for each sematic depth level based on the multiple associated keywords using the semantic depth database.

The semantic depth engine according to the embodiment of the present invention may include a candidate keyword providing unit configured to derive the multiple candidate keywords associated with the keyword inputted by the client based on the search database; and a recommended keyword providing unit configured to provide recommended keywords constituting the recommended keyword lists for each of the multiple semantic depth levels based on the semantic depth database according to a predetermined grouping algorithm with regard to the candidate keywords derived by the candidate keyword providing unit.

The recommended keyword providing unit according to the embodiment of the present invention may perform grouping for multiple recommended keyword groups according to each directory by carrying out a process for clustering multiple associated keywords derived by the candidate keyword providing unit with similar keywords corresponding to the same directory. Furthermore, the recommended keyword providing unit may perform re-grouping of multiple keyword groups resulting from carrying out the clustering process into multiple upper groups including multiple recommended keyword groups for each directory according to the keyword inputted from the client and each semantic depth level, thereby constituting the recommended keyword lists according to re-grouped results.

Preferably, the semantic depth engine may save a semantic depth tree structure for each keyword composed of the recommended keyword lists in the semantic depth database so that the semantic depth database can be updated.

Meanwhile, the semantic depth engine according to the embodiment of the present invention may create one or more extended synonyms using one or more basic synonyms related to candidate keywords or recommended keywords upon deriving the candidate keywords or the recommended keywords.

Furthermore, the semantic depth engine may further include a transmission unit intended for transmitting keywords derived by the candidate keyword providing unit or the recommended keyword providing unit to the interface unit in order to provide the keywords via the search interface.

The system according to the embodiment of the present invention may further include: a content database configured to save related content data according to multiple recommended keywords for each directory; and a search engine configured to search one or more kinds of content regarding a specific keyword inputted from the client based on the content database and to provide the searched content via the search interface. Also, the system may further include a control unit configured to control the interface unit, the semantic depth engine, and the search engine and the inside of the keyword presenting system.

In order to accomplish the above objects, according to another aspect of the other embodiment of the present invention, there is provided a keyword presenting method, which presents recommended keywords via a keyword presenting system, comprising: an interface unit connected with a client via a network and configured to provide a search interface presenting multiple candidate keywords; a search database configured to save multiple search results and multiple candidate keywords constituting the search interface; a semantic depth database configured to save a semantic depth structure representing a semantic distance between keywords according to each candidate keyword; and a semantic depth engine configured to derive multiple associated keywords based on the search database with regard to the keyword inputted from the client and to support a function of presenting recommended keyword lists according to each semantic depth level based on the multiple associated keywords. The keyword presenting method comprises the steps of: (a) receiving information on a predetermined keyword inputted from the client via the search interface provided by the interface unit; (b) deriving, based on the search database, multiple candidate keywords associated with the keyword inputted from the client; and (c) deriving, based on the semantic depth database, the multiple associated keywords according to each candidate keyword to form recommended keyword groups according to each semantic depth level and gradationally presenting the recommended keyword lists for each semantic depth level according to a user selection.

Step (b) above according to the other embodiment of the present invention may further include: analyzing morphemes of the candidate keywords and one or more basic synonyms related to the candidate keywords upon deriving the candidate keywords; removing a common postfix or a common suffix from the candidate keywords and the basic synonyms according to an analysis result of the morphemes; and creating extended synonyms using a string matching technique with regard to the remaining words after removal of the common postfix or the common suffix from the candidate keyword and the basic synonyms.

Also, Step (b) above according to the other embodiment of the present invention may further include: analyzing morphemes of the candidate keywords upon deriving the candidate keywords; performing keyword counting for each morpheme according to analysis results of the morphemes; deriving synonyms with regard to morphemes beyond a predetermined standard value based on counting results for each morpheme; and creating extended synonyms using the morphemes constituting the candidate keywords and the character string matching technique between the synonyms.

Preferably, Step (c) above according to the other embodiment of the present invention may be characterized by deriving the multiple associated keywords from the semantic depth database based on the candidate keywords, the basic synonyms and the extended synonyms.

Similarly, Step (c) above according to the other embodiment of the present invention may further include: analyzing morphemes of the recommended keywords and one or more basic synonyms related to the recommended keywords upon the deriving of the recommended keywords; removing a common postfix or a common suffix from the recommended keywords and the basic synonyms according to morpheme analysis results; and creating extended synonyms using the character string matching technique with regard to the remaining words after the removal of the common postfix or the common suffix from the recommended keywords and the basic synonyms to increase the number of recommended keywords.

Step (c) above according to the other embodiment of the present invention may include: constituting an associated keyword list containing the multiple associated keywords derived according to each candidate keyword based on the semantic depth database; performing a primary keyword grouping process using a hierarchical clustering technique based on a character string distance between keywords with regard to the associated keyword list; performing a secondary keyword grouping process using an affix clustering technique based on a suffix or a postfix of the keywords with regard to the associated keyword list; and performing a third keyword grouping process for segmenting the remaining keywords after the grouping using the clustering technique into the same group.

Furthermore, Step (c) above may further include: analyzing a semantic depth level between the keyword inputted from the client and keywords belonging to each group based on multiple keyword groups resulting from the grouping;

re-grouping multiple keyword groups which satisfy a semantic depth level of the same category into one upper group for each semantic depth level according to analysis results; and constituting recommend keyword lists for each semantic depth level by using, as recommended keywords, representative keywords representing each group from multiple keyword groups belonging to the upper groups for each semantic depth level.

The primary keyword grouping process according to the other embodiment of the present invention may include: checking meanings representing a combination between associated keywords to replace corresponding keywords with codes for each meaning according to a predetermined condition; calculating an editing distance between the keywords by applying a predetermined similarity calculation function with regard to the keywords replaced with the codes and measuring a similarity value; and grouping the keywords into the same directory group when the similarity value is beyond a predetermined standard value according to results of the similarity measurement.

Also, the secondary keyword grouping process according to the other embodiment of the present invention may be characterized by grouping the keywords having the same postfix information or the same suffix information in the associated keyword list into the same directory group.

Furthermore, the keyword presenting method according to the other embodiment of the present invention may further include the steps of: (d) gradationally providing the recommended keyword lists from an upper directory to a subdirectory via the search interface according to a user selection signal inputted from the client; and (e) searching one or more kinds of content regarding a specific recommend keyword inputted from the client based on the content database and providing the searched content to the client via the search interface, wherein the keyword presenting system further includes a content database configured to save content data related according to each recommend keyword; and a search engine configured to search one or more kinds of content corresponding to the recommended keywords based on the content database.

The above-described embodiments are only a part of preferred embodiments of the present invention, and various embodiments in which technical features of the present invention are reflected may be derived and understood by those having ordinary skill in the art based on the detailed description of the present invention which will be hereinafter described.

According to the embodiments of the present invention, since recommended keywords related to a corresponding keyword based on search data inputted by a user are gradationally provided according to each semantic depth level, various keywords for each issue semantically related to the keyword are gradationally presented so that the search user can recognize words which he or she may not have normally considered, thereby widening a search scope and increasing search convenience.

BRIEF DESCRIPTION OF THE DRAWINGS

The accompanying drawings included as a part of the detailed description to provide an easily understood description of the present invention show embodiments of the present invention and explain technical ideas of the present invention. The above and other objects, features and other advantages of the present invention will be more clearly understood from the following detailed description when taken in conjunction with the accompanying drawings, in which:

FIG. 6 is one example of a synonym thesaurus for semantic-based character string similarity calculation on the basis of a hierarchical clustering method according to an embodiment of the present invention;

FIG. 10 is another example of a recommended keyword service for each semantic depth level presented by the keyword presenting system according to one embodiment of the present invention.

DETAILED DESCRIPTION OF THE INVENTION

Figure 1:
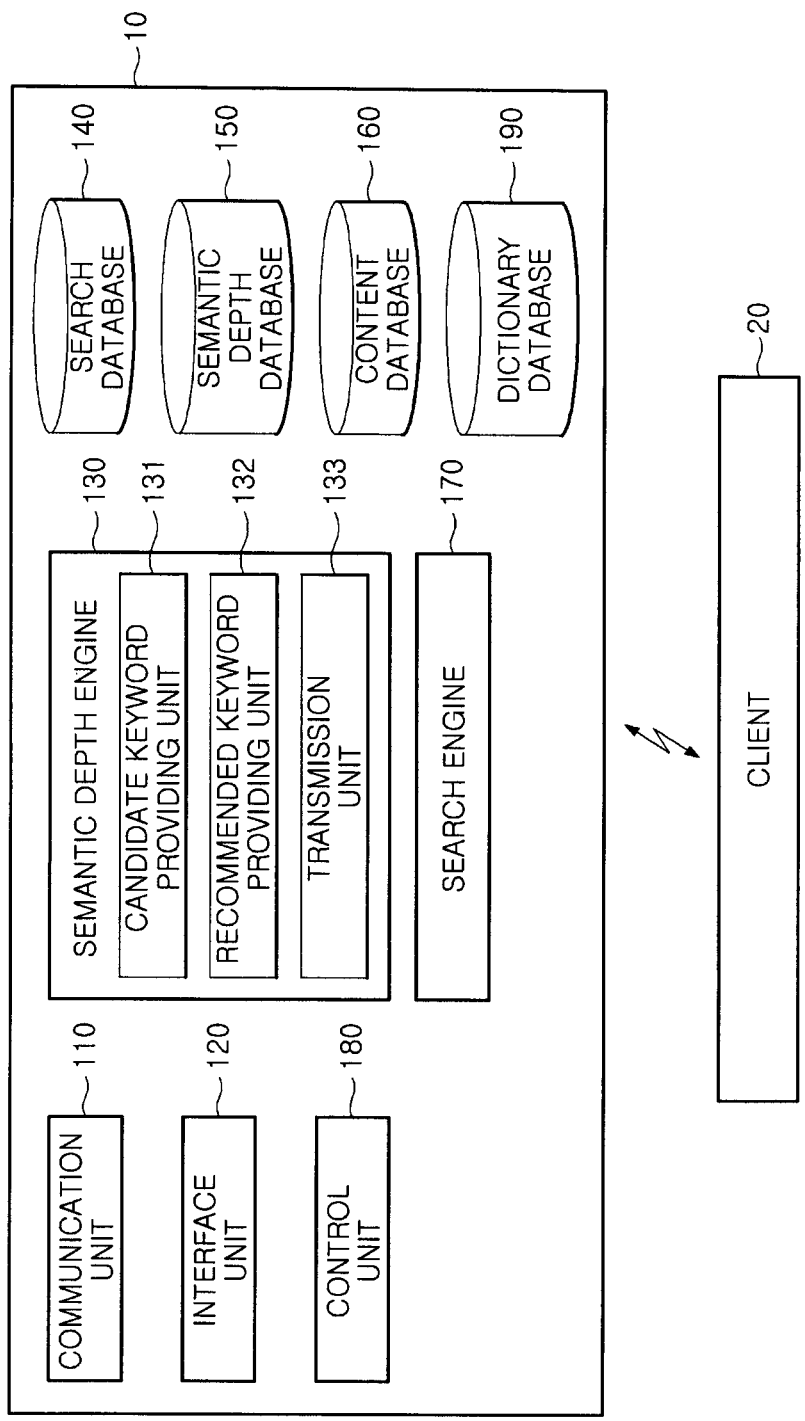
FIG. 1 is one example of a keyword presenting system using a semantic depth structure according to an embodiment of the present invention.

Embodiments of the present invention are capable of various modifications and alternative forms and are shown by way of example in the drawings, and the embodiments of the present invention will herein be described in detail. In the following description, it is to be noted that, when the functions of conventional elements and the detailed description of elements related with the present invention make the gist of the present invention unclear, a detailed description of those elements will be omitted.

The present invention will be described in detail below with reference to the accompanying drawings. The detailed description which will be described below with reference to the accompanying drawings is only intended to explain exemplary embodiments of the present invention and the present invention should not be construed as limited to the embodiments set forth herein. The detailed description includes detailed matters in order to provide a fully understood description of the present invention. However, those skilled in the art will appreciate that the present invention may be embodied even without such detailed matters.

The present invention relates, in general, to a system and a method for presenting recommended keywords upon using a search service and, more particularly, to a system and a method for gradationally presenting a variety of recommended keywords associated with a keyword according to 'a semantic depth structure' with regard to the keyword inputted in a search window in a search.

The term 'semantic depth structure' set forth in the present specification refers to a structure which represents a level semantically associated with a keyword, and is defined as a kind of tree structure in which levels presented in a search engine are divided according to each semantic depth level, and which includes recommended keywords according to multiple directories in the same semantic depth level.

FIG. 1 is one example of a system for presenting keywords using a semantic depth structure according to one exemplary embodiment of the present invention.

Referring to FIG. 1, a keyword presenting system 10 according to the present invention includes: a communication unit 110 configured to transmit and receive data for a search with a client 20 via a network; an interface unit 120 configured to receive a keyword inputted from the client 20 and to provide multiple search interfaces; a semantic depth engine 130 configured to support a function of gradationally presenting multiple recommended keywords for each directory according to semantic depth levels based on the keyword inputted from the client 20; a search database 140 configured to save multiple keyword candidates and multiple search results constituting the search interfaces; a semantic depth database 150 configured to gradationally present multiple recommended keywords associated with the respective keyword candidates according to the semantic depth levels; a content database 160 configured to save content materials according to the respective multiple recommended keywords; a search engine 170 configured to carry out a corresponding content search through the content database 160 using a keyword specified by a user; and a control unit 180 configured to control operations for each function of the keyword presenting system 10 as well as the search engine 170.

Hereinafter, respective elements of the system 10 according to the present invention will be described.

The communication unit 110 may include one or more modules which enable wired and wireless communication between networks in which the system 10 and the client 20 or the system 10 and another system are located.

The interface unit 120 includes a search interface for providing content so that a search user can use a search service. The search interface refers to wired content or wireless content which enables the search user to use the search service, and if any interface can provide a search service function, the interface can be used as the search interface even if it is not provided in a content form. Basically, an input window used by the search user for input, and search buttons configured to execute a search are present in the search interface.

Accordingly, the user may obtain a search result by pressing the search buttons after inputting a keyword in the input window.

The semantic depth engine 130 includes: a candidate keyword providing unit 131 configured to derive multiple keyword candidates associated with a keyword inputted from the client 20 from the search database 140; a recommended keyword providing unit 132 configured to generate and suggest multiple recommended keywords for each semantic depth level associated with the corresponding keyword based on the keywords derived by the candidate keyword providing unit 131; a transmission unit 133 configured to transmit the keyword candidates generated from the candidate keyword providing unit 131 and the recommended keywords for each semantic depth level generated from the recommended keyword providing unit 132 to the interface unit 120 so that these keywords can be presented via the search interface.

The candidate keyword providing unit 131 derives keywords associated with the keyword inputted from the client 20 or multiple keyword candidates such as synonyms of the keyword inputted from the client from the search database 140, thereby transmitting the derived keywords or keyword candidates to the client 20. Also, the candidate keyword providing unit 131 derives one or more search interface files associated with the keyword based on the search database 140 and transmits the derived search interface files to the client 20, thereby providing users with access to search services.

Also, the candidate keyword providing unit 131 may search basic synonyms associated with the keyword and may increase the number of keywords by performing synonym extension using a predetermined string matching technique.

For example, when a keyword 'wedding" inputted by the user from the client 20 is transmitted, the candidate keyword providing unit 131 carries out a search for words containing the word 'wedding' and synonyms of the word 'wedding' based on the search database 140. As related keywords containing the word 'wedding,' there are the words 'wedding,' 'wedding consulting agency,' 'wedding preparation,' 'wedding expense,' 'wedding present,' 'wedding hall,' 'wedding fashion' and the like, and as related keywords regarding the synonyms of the word 'wedding,' there are the words 'wedding photo,' 'marriage registration' and the like. These words may be keyword candidates associated with the word 'wedding.'

The candidate keyword providing unit 131 transmits searched multiple keyword candidates to the interface unit 120 via the transmission unit 133, and the interface unit 120 provides the client 20 with a search interface so that the derived multiple keyword candidates can be presented on the search input window in a spreading menu form when the client 20 uses a search service, and as a result, the client 20 may select a desired word (e.g., the word 'wedding hall') among the presented keyword candidates.

The recommended keyword providing unit 132 derives recommended keywords for each semantic depth level associated with one keyword based on the semantic depth database 150 with regard to the one keyword specified by the client 20 among the multiple keyword candidates provided from the candidate keyword providing unit 131. To do so, the recommended keyword providing unit 132 carries out a process for clustering multiple keywords stored in the semantic depth database 150 as similar keywords according to a predetermined related model algorithm, and also carries out a process for classifying the multiple similar keywords into one or more directories according to keyword characteristics.

For example, the recommended keyword providing unit 132 may provide multiple recommended keywords (e.g., church wedding, catholic church wedding, hotel wedding, house wedding, and the like) for each directory belonging to the same semantic depth level as that the specific keyword 'wedding hall' selected by the user among the multiple keyword candidates. At this time, the recommended keywords, which have been presented, may be deemed to be representative keywords which may be represented according to each directory in a corresponding semantic depth level.

Similarly, the recommended keyword providing unit 132 transmits the searched multiple keyword candidates to the interface unit 120 through the transmission unit 133, the interface unit 120 provides a search interface to the client 20 so that multiple recommended keywords for each directory derived on the search input window according to each semantic depth level can be presented in an expanding menu form when the client 20 uses a search service, and the client 20 may select desired keywords among the presented recommended keywords.

That is, the recommended keywords for each directory may be variously provided according to the recommended keywords selected by the user from an upper level to a lower level according to semantic depth levels.

Furthermore, the semantic depth engine 130 may derive associated keywords in real time according to a keyword inputted based on the search database 140 and the semantic depth database 150, may generate a semantic depth structures, and stores the generated semantic depth structure for each keyword in the semantic depth database 150, thereby performing database construction so as to be utilized upon inputting of the same keyword in the future.

Also, the recommended keyword providing unit 132 may carry out a search for basic synonyms associated with recommended keywords for each directory and may increase the number of recommended keywords by synonym extension using a predetermined string matching technique with regard to the searched basic synonyms.

The semantic depth engine 130 may be implemented using a processor, and the different units 131, 132 and 133 thereof may be separate components of the processor. The candidate keyword providing unit 131, the recommended keyword providing unit and the transmission unit 133 may also be different instruction programs executed by the processor for performing their respective functions described above. These programs may be stored in a computer-readable recording medium, such as a hard disk, a CD-ROM, a DVD, a ROM, a RAM, or a flash memory.

The search engine 170 searches one or more kinds of content related to search motions performed by the semantic depth engine 130 and specific keywords selected by the user based on the content database 160 and provides the content to the client 20. The search engine 170 is implemented using a processor, separate from the processor of the semantic depth engine 130. However, the processor for the search engine 170 may also incorporate and perform the functions of the semantic depth engine 130.

The control unit 180 controls functional motions of the keyword presenting system 10 as well as functional motions of the semantic depth engine 130 and the search engine 170.

Furthermore, the keyword presenting system 10 according to the present invention may further include a dictionary database 190 in which all words are stored in a state of being associated with information on synonyms, antonyms, derivatives and the like therefor. While searching a predetermined keyword based on the search database 140 and the semantic depth database 150, the semantic depth engine 130 may further search synonyms and the like of a specific keyword based on the dictionary database 190.

As such, a task performed by the keyword presenting system 10 illustrated in FIG. 1 for processing synonyms based on a keyword inputted by a user will be described with reference to FIGS. 2 and 3.

Figure 2:
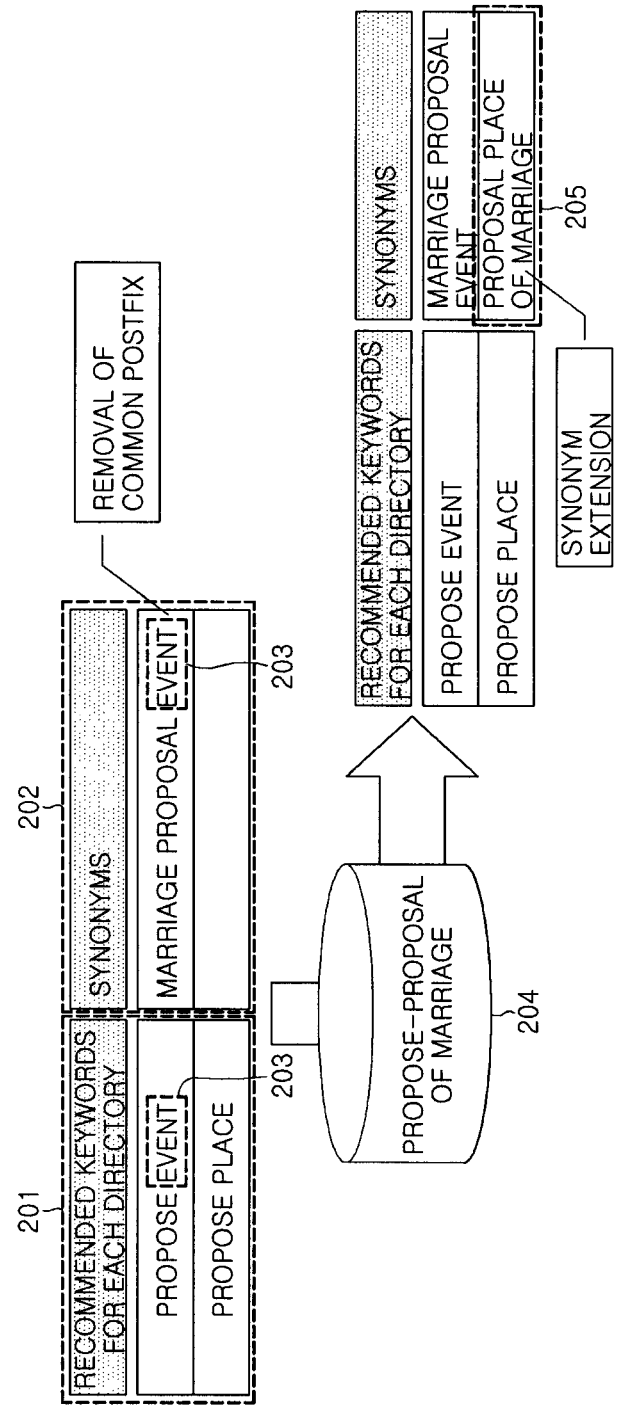
FIG. 2 shows a process for deriving keywords using a synonym extending technique according to one embodiment of the keyword presenting system of the present invention.

FIG. 2 shows a process for deriving keywords using a synonym extension technique according to one embodiment of the present invention.

The semantic depth engine 130 illustrated in FIG. 1 may search one or more basic synonyms associated with a predetermined keyword inputted by a user based on the search database or the semantic depth database 150, and may generate one or more extended synonyms using the searched basic synonyms and a string matching technique.

That is, as illustrated in FIG. 2, the recommended keyword providing unit 132 of the semantic depth engine 130 may derive one or more basic synonyms 202 with regard to a specific recommended keyword selected by the user from among one or more recommended keywords 201 for each directory based on the search database 140 or the semantic depth database 150. Furthermore, extended synonyms 205 are derived from dividing the recommended keywords 201 and the basic synonyms 202 according to each word to segment remaining words 204 except for common prefixes or postfixes 203 into exchangeable words and applying a character string matching technique among the recommended keywords and the basic synonyms.

For example, among the recommended keywords 201 for each directory primarily inputted by the user: 'propose,' 'propose event,' 'propose place,' and the like, which are associated with the word 'wedding,' the keyword 'marriage proposal event' may be derived as a synonym of the keyword 'propose event.' At this time, the recommended keyword providing unit 132 extracts all words which may be replaced by dividing recommended keywords and synonyms into respective words according to a synonym extension technique. That is, in the recommended keywords 201 and the basic synonyms 202 such as 'propose event' and 'marriage proposal event,' the word 'event' which is a common word 203 of the keyword and the synonym may be removed. Furthermore, with regard to another recommended keyword 'propose place,' the word 'proposal of marriage' which is a synonym of the word 'propose' may be regenerated as an extended synonym 205 'proposal place of marriage' using a character string matching technique.

Figure 3:
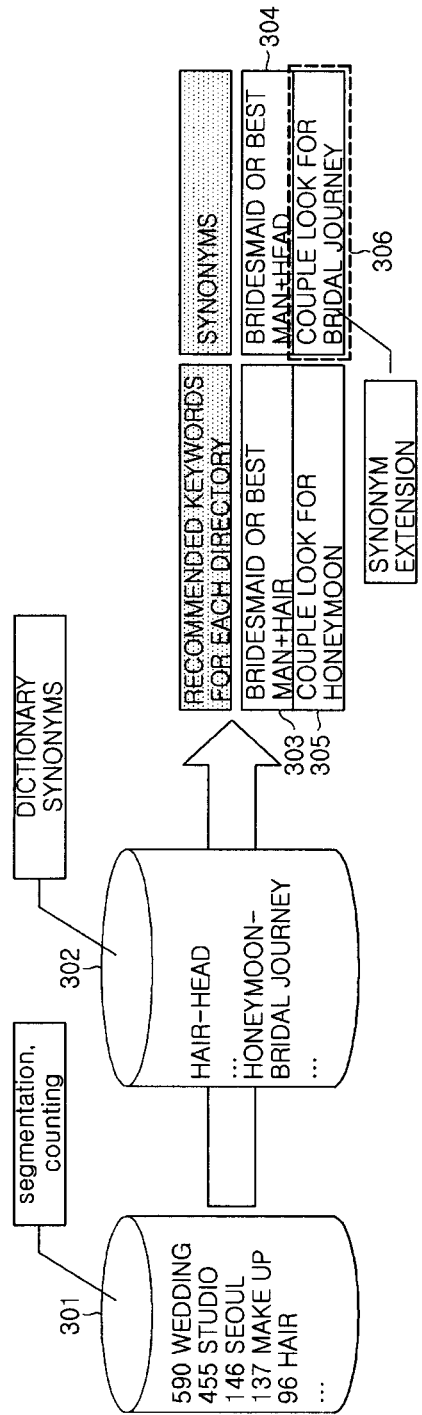
FIG. 3 shows a process for deriving keywords using a synonym extending technique according to another embodiment of the keyword presenting system of the present invention.

FIG. 3 shows a process for deriving keywords using a synonym extension technique according to another embodiment of the present invention.

The semantic depth engine 130 described with respect to FIG. 1 may analyze the morpheme of a keyword based on the search database 140 or the semantic depth database 150 and may generate one or more extended synonyms using an analysis result of the morpheme resulting from the analysis and a synonym dictionary of the dictionary database 190.

Referring to FIG. 3, the semantic depth engine 130 performs segmentation for each word with regard to all recommended keywords for each directory corresponding to a specific keyword and counting for the segmented respective words using a morpheme analyzer, thereby constituting a first list 301. As a result of segmenting many recommended keywords for each directory derived from the keyword 'wedding,' when the segmented keywords 'wedding,' 'studio,' 'Seoul,' 'make-up,' and 'hair' are counted and listed according to each morpheme, the semantic depth engine constitutes a second list 302 by searching synonyms based on the dictionary database 190 with regard to the upper k morphemes according to a condition of the number of being counted among the respective morphemes and matching the searched synonyms with the upper k morphemes.

Thus, the word 'head' which is a synonym of the word 'hair,' and the word 'bridal journey' which is a synonym of the word 'honeymoon' may be searched. By applying a string matching technique based on the searched synonyms, a basic synonym 304 'bridesmaid or best man+head' in which the word 'head' as the synonym of the word 'hair' is used may be derived from a recommend keyword 303 'bridesmaid or best man+hair,' and an extended synonym 306 'bridal journey+couple look' in which 'bridal journey' as the synonym of the word 'honeymoon' is used may be derived from a recommended keyword 305 'honeymoon+couple look.'

Next, with regard to the keyword presenting system according to an embodiment of the present invention, a process for clustering a list of associated keywords with similar keywords will be described.

Various techniques may be used as the clustering technology, and in the present invention, a hierarchical clustering technique and an affix clustering technique are used as one example.

The hierarchical clustering technique refers to a technique for grouping adjacent clusters using a minimum distance and measures similarity using a distance among character strings or calculates a semantic-based character string distance. The calculation of the semantic-based character string distance is performed in such a manner as to calculate an editing distance by replacing a corresponding keyword with a representative synonym.

The affix clustering technique is a technique for grouping clusters according to respective keywords using prefix or postfix information.

Hereinafter, a process for processing recommended keyword segmentation using the clustering technique will be described with reference to FIG. 4.

Figure 4:
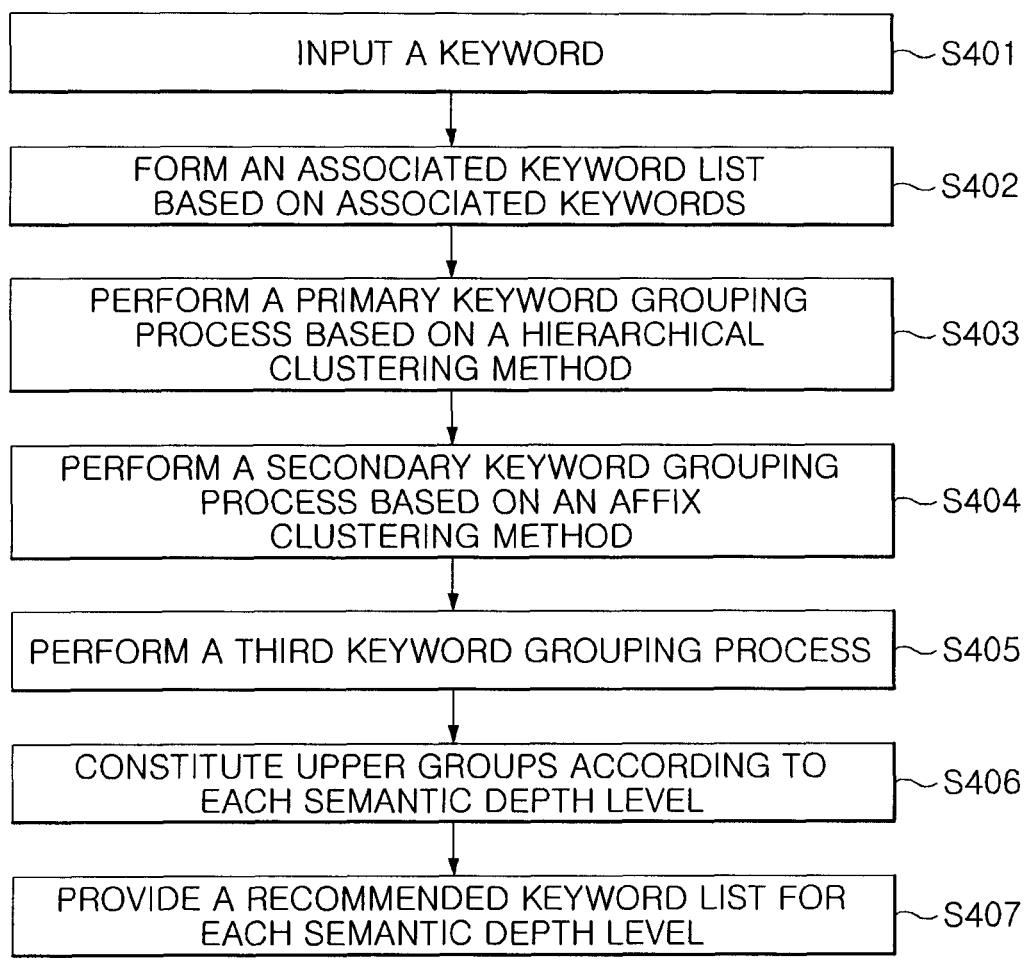
FIG. 4 shows one example of a process for classifying recommended keywords for each directory according to one embodiment of the present invention.

FIG. 4 is a flow chart showing one example of a process for segmenting recommended keywords for each semantic depth level related to a keyword according to respective directories according to an embodiment of the present invention.

Referring to FIG. 4, when a predetermined keyword is inputted from the client 20 (S401), the semantic depth engine 130 derives multiple associated keywords based on the inputted keyword and forms a keyword list composed of the derived associated keywords (S402).

At this time, extended synonyms as well as basic synonyms associated with the keyword may be searched as associated keywords according to the aforesaid method.

Hereinafter, the semantic depth engine 130 performs a primary keyword grouping process using a hierarchical clustering technique (S403).

For example, the hierarchical clustering technique may refer to a technique for grouping adjacent clusters in the shortest distance using a minimum distance among words and may use a method of measuring similarity using the distance among character strings or calculating a semantic-based character string distance.

The calculation of an editing distance between character strings is performed in such a manner as to calculate similar information of inputted two character strings, and the following Equation 1 is used for similarity calculation.

$$lev_{a,b}(i, j) = \begin{cases} \max(i, j) & \text{if } \min(i, j) = 0, \\ \min \begin{cases} lev_{a,b}(i-1, j) + 1 \\ lev_{a,b}(i, j-1) + 1 \\ lev_{a,b}(i-1, j-1) + [a_i \neq b_j] \end{cases} & \text{otherwise} \end{cases}$$

[Equation 1]

Referring to Equation 1 above, a semantic-based character string similarity is calculated in such a manner as to calculate similar information with regard to two keywords (i, j), and when the similarity of the two keywords satisfies a predetermined similarity standard value, the two keywords are grouped into the same group. At this time, for the calculation of the similarity, words constituting each keyword may be digitized by the distance among codes using the codes provided to each directory of the corresponding words.

The calculation of the semantic-based character string distance is performed by calculating similarity information of the inputted two character strings in such a manner as to search a representative synonym based on the Korean dictionary database 190 and calculating an editing distance by replacing the corresponding keyword with a representative word as the substitution by a representative synonym. For example, with regard to the word 'Pusan wedding,' even though the word 'Daejeon wedding' or 'Seoul wedding,' may not be deemed to be a synonym in terms of a characteristic of the word, the word 'Daejeon wedding' or 'Seoul wedding,' may be deemed to be a synonym as a combination of the common word 'wedding' and the word representing 'a regional name.' This will be hereinafter described with reference to FIG. 5.

When the primary keyword grouping process according to the hierarchical clustering technique is completed, the semantic depth engine 130 performs a secondary keyword grouping process based on the affix clustering method of grouping keywords having the same prefixes into the same group by using postfix or suffix information of the multiple keywords included in the keyword list (S404).

For example, when the keyword list associated with the inputted keyword includes the keywords 'Geopillow's pillow,' 'live information show-baby pillow,' 'millet pillow,' 'organic blanket,' 'quilt blanket,' 'summer blanket' and the like, the respective keywords may be segmented into the common postfixes 'pillow' and 'blanket.'

Referring to FIG. 4 again, the semantic depth engine 130 performs a third keyword grouping process for grouping keywords, which are not grouped in any directory group in the keyword list as a result of performing the primary keyword grouping process using the hierarchical clustering method and the secondary keyword grouping process using the affix clustering method, in separate groups (S405).

Table 1 below shows a result of performing the clustering process based on the associated keyword list according to the keyword grouping processes described with reference to FIG. 4.

TABLE 1

Keyword: Church Wedding

| The List of Associated Keywords | Clustering Result |
|---|---|
| Church wedding expense, Catholic church wedding, Pusan church wedding, Daejeon church wedding, Cheonan church wedding, Ulsan church wedding, Suwon church wedding, church wedding preparation, church wedding recommendation, outdoor wedding ceremony, hotel wedding, buffet caterer, traditional wedding, house wedding, outdoor wedding | Church wedding expense/church wedding preparation |
| | Pusan church wedding/Daejeon church wedding/Cheonan church wedding/Ulsan church wedding/Suwon church wedding Outdoor wedding |

TABLE 1-continued

Keyword: Church Wedding

| The List of Associated Keywords | Clustering Result |
|---|---|
| | ceremony/outdoor wedding Catholic church wedding/church wedding recommendation/hotel wedding/buffet caterer/traditional wedding/house wedding |

Referring to Table 1 above, in a case where keyword data transmitted from the client 20 is the keyword 'church wedding,' the semantic depth engine 130 may form the list of associated keywords composed of candidate keywords, basic synonyms, extended synonyms and the like related to the corresponding keyword using the synonym extension technique according to the embodiment of the present invention.

Based on the list of the associated keywords, the primary keyword grouping process may be performed with a first group (church wedding expense and church wedding preparation) composed of various kinds of information necessary for carrying out the 'church wedding' and a second group (Pusan church wedding, Daejeon church wedding, Cheonan church wedding, Ulsan church wedding, and Suwon church wedding) composed of various kinds of information for preparing the church wedding according to each region resulting from the calculation of semantic-based similarity using the hierarchical clustering method.

Next, the secondary grouping process for grouping one or more keywords having common prefixes or postfixes in the list of the associated keywords into the same group using the affix clustering method may be performed, and a third group (outdoor wedding ceremony and outdoor wedding) may be composed of the keywords having the common prefix 'outdoor' in Table 1 above The remaining keywords after performing the grouping processes according to hierarchical clustering method and the affix clustering method may be grouped into a fourth group (Catholic church wedding, church wedding recommendation, hotel wedding, buffet caterer, traditional wedding, and house wedding).

Referring to FIG. 4 again, after the semantic depth engine 130 has performed the grouping processes using various methods, the upper groups for each semantic depth level of the keywords is formed by analyzing the semantic depth level between the keywords inputted by the user in Step S401 above (S406). That is, as described through Equation 1 above, multiple keyword groups belonging to a predetermined scope may be re-constituted into the upper group belonging to the same semantic depth level by calculating the distance between keywords for each group associated with a corresponding keyword based on the specific keyword using a method of calculating a minimum semantic distance between two words. This will be described with reference to FIG. 8 and the example thereof is illustrated in FIG. 9.

When the grouping process for the upper group is performed, the semantic depth engine 130 forms and provides a list of recommended keywords by selecting representative keywords for representing each group from multiple keyword groups for each directory belonging to the same final semantic depth level from data of the keyword inputted by the user and presenting the selected representative keywords as the recommended keywords (S407).

The list of the multiple recommended keywords for each semantic depth level may be provided to the client 20 via the search interface of the interface unit 120 and may be provided in an expanding form on a search input window.

The grouping process for the recommended keywords for each directory based on the clustering method which has been described with reference in FIG. 4 will be hereinafter described with reference to FIGS. 5 and 6.

Figure 5:
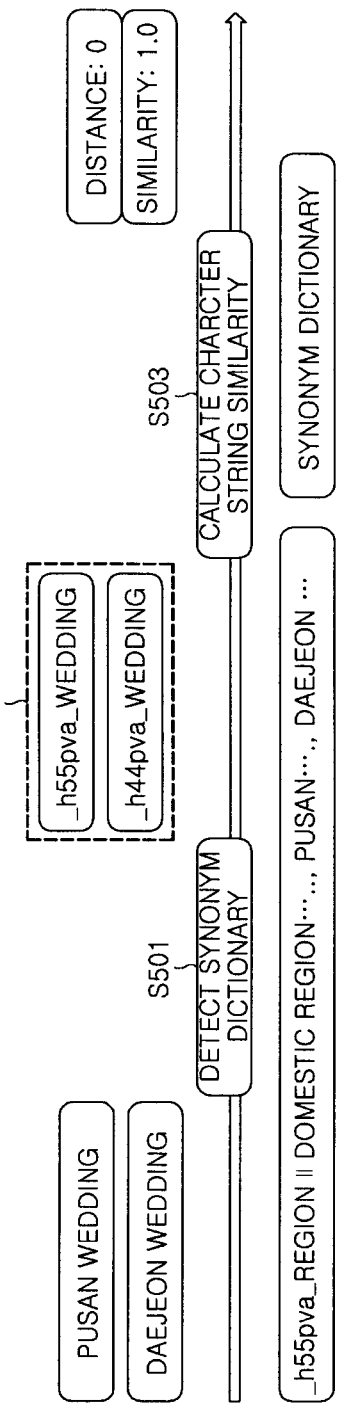
FIG. 5 shows one example of a semantic-based character string similarity calculation method on the basis of a hierarchical clustering method according to one embodiment of the present invention.

FIG. 5 shows one example of a semantic-based character string similarity calculating method based on the hierarchical clustering method according to the embodiment of the present invention.

Referring to FIG. 5, when a keyword of a combination of a word which means a 'region' and a word 'wedding,' based on the meanings of the words, is inputted, a word representing another region which is semantically different from the word representing the inputted region becomes a synonym, and a similarity therebetween may be calculated. As exemplified in FIG. 5, with regard to the keyword 'Pusan wedding,' the region of the keyword may be segmented into domestic regions and foreign regions via a code (_h55pva) for the regional name 'Pusan,' and the other words of the domestic region 'Seoul,' 'Daegu,' 'Daejeon,' 'Gwangju' and the like may be investigated based on the synonym dictionary (S501).

Here, the words 'Pusan' and 'Daejeon' representing a region with regard to the keywords 'Pusan wedding' and 'Daejeon wedding' is replaced with the code (_h55pva_) which means a domestic region (S502). The common word between the two keywords 'wedding' may not be replaced with a separate code.

Furthermore, with regard to the two coded keywords, a value of character string similarity is calculated (S503). At this time, the value of the character string similarity ranges from 0.0 to 1.0, and according to a level of the similarity, the value may be calculated in such a manner that the value of the similarity is increased. That is, the smaller the value of the similarity between the two keywords, the closer said value is to zero; and the larger the value of the similarity, the closer the calculated value is to 1.0. Accordingly, since the two keywords 'Pusan wedding' and 'Daejeon wedding' exemplified in FIG. 5 are replaced with the code 'h55pva_wedding,' a semantic-based character string distance between the two keywords is 0 and a value of the similarity satisfies 1.0. Accordingly, the keywords representing weddings for each region such as 'Pusan wedding' and 'Daejeon wedding' may be primarily grouped in the same directory.

As such, a thesaurus representing a relation of synonyms, hyponyms, and related words and the like may be used for a method of applying a directory to each keyword (guide words) for data searching. The search method using the thesaurus is called a comprehensive search and has been widely used as a way to search as much data as possibly in news or article sources related to a used keyword, or to increase search efficiency by adjusting a difference between a keyword input by a user and keywords used by a database.

FIG. 6 shows one example of a synonym thesaurus for calculating a value of semantic-based character string similarity using the hierarchical clustering method according to the embodiment of the present invention.

As exemplified in FIG. 6, guide words representing a region are segmented into one directory, and codes may be assigned according to characteristics for each directory of the corresponding guide words. With regard to the names of the domestic regions of guide words such as Seogwipo, Naju-si, Samjeong-dong, when the regions are segmented into domestic regions and foreign regions, the same code 'h55pva' may be assigned to the guide words by segmenting the guide words into a directory 601 representing a domestic region. When a directory 602 is a foreign region, by setting various directories with a country name directory 602 and a general foreign region directory 602b as a subdirectory, the codes h55vktvzt, h55vktbhq which are consistent with each directory may be assigned.

As another example illustrated in FIG. 6, when the word 603 'car' is set as an upper directory, by setting multiple subdirectories with regard to keywords related to the word 'car' such as a subdirectory 603a related to the keyword 'car model' and a subdirectory 603b related to the keyword 'car manufacturer,' a subdirectory 603c related to the keyword 'petrol station/an oil price' and the like, codes which are consistent with the directories may be assigned.

As such, the keywords to which the same code is assigned may be deemed to be synonyms and may be provided to the user as recommended keywords for the same directory via the search interface. For example, a subdirectory related to the keyword 'shopping place' in an upper directory such as 'shopping' may include the guide words such as 'regional department store,' 'duty free shop,' 'plaza' and the like and the guide words may be provided with related keywords as final synonyms.

Figure 7:
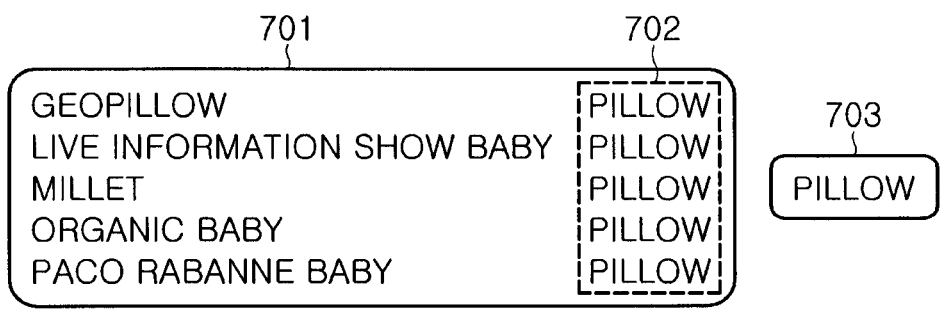
FIG. 7 is one example of keyword grouping based on an affix clustering method.

FIG. 7 shows one example of a keyword grouping process using an affix clustering method according to the embodiment of the present invention.

Referring to FIG. 7, by analyzing the forms of prefixes or postfixes with regard to the words contained in a keyword list, keywords containing the same postfixes or prefixes may be grouped into the same group. As exemplified, a keyword list 701, the keywords 702 containing prefixes representing the type or form of a 'pillow' such as 'Geopillow-pillow,' 'live information show-baby pillow,' 'millet pillow,' 'organic baby pillow,' and 'Paco Rabbane-baby pillow' may be grouped into the same directory because these keywords use the common postfix 703 'pillow.'

Figure 8:
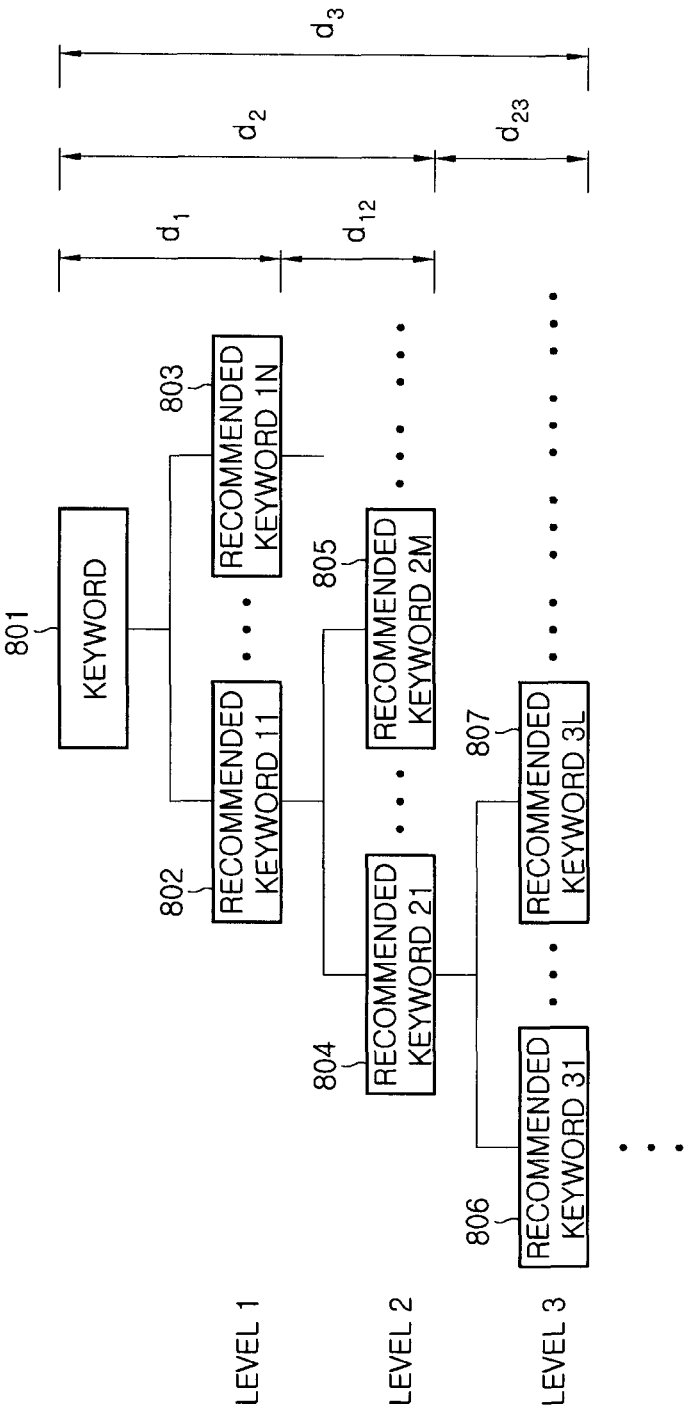
FIG. 8 shows one example of a semantic depth structure of keywords derived from the keyword presenting system according to an embodiment of the present invention.
Figure 9:
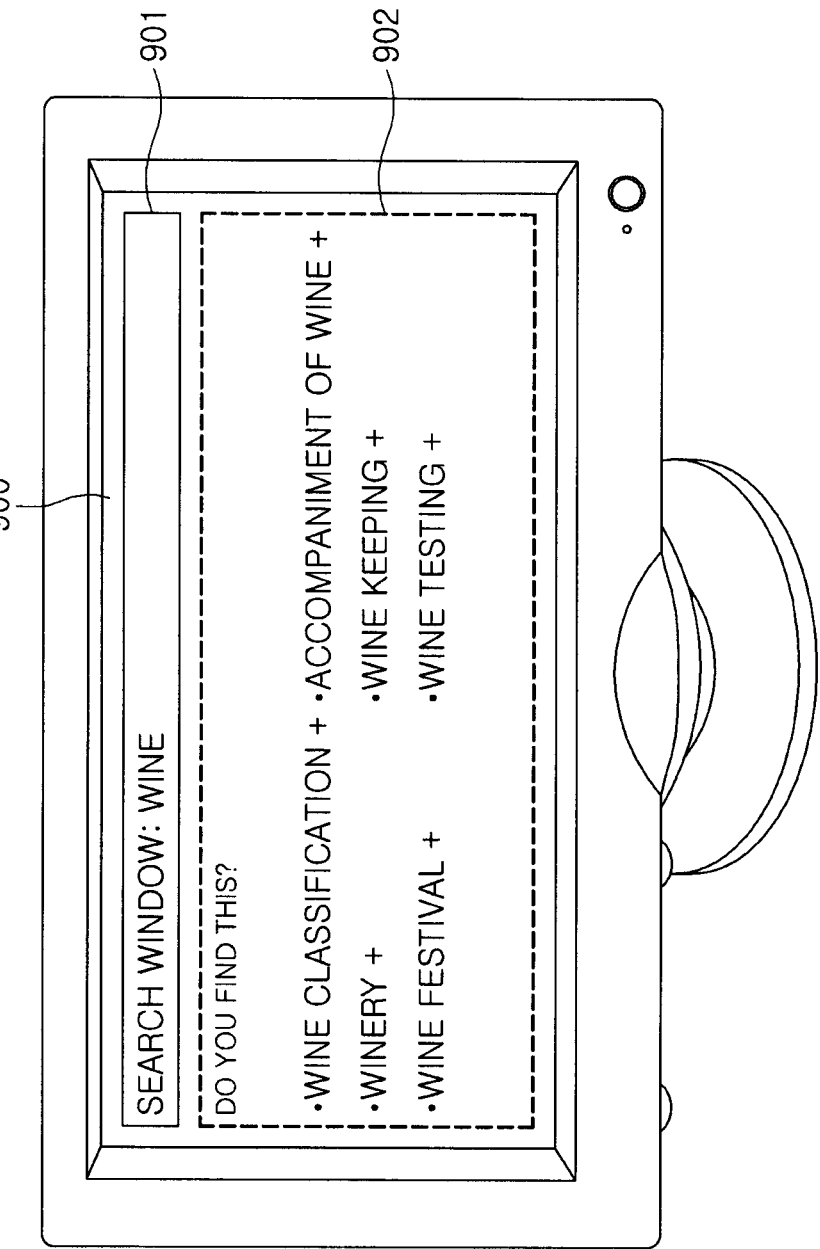
FIG. 9 is one example of a recommended keyword service for each directory presented by the keyword presenting system according to an embodiment of the present invention.

FIG. 8 shows one example of a semantic depth structure derived by the keyword presenting system 10 according to the embodiment of the present invention.

Referring to FIG. 8, multiple associated keywords are grouped into multiple upper groups for each semantic depth level and subgroups for each directory constituting each semantic depth level by calculating a semantic word distance (i.e., a semantic depth level) based on a specific keyword 801 inputted by a user, so that a depth tree structure can be constituted. At this time, recommended keywords exemplified in FIG. 8 are assumed as representative keywords extracted for representing multiple groups grouped according to each directory through the hierarchical clustering method, the affix clustering method and other grouping processes as described in the section regarding FIG. 4.

Multiple keyword groups 802, 803, in which a word distance with the specific keyword 801 inputted by the user belongs to a first category d1, are segmented into the same semantic depth level (Level 1) so that a first recommended keyword list presented in Level 1 can be constituted. At this time, the recommended keyword (11) 802 or the recommended keyword (1N) 803 belonging to Level 1 is grouped into a first group of the same semantic depth level as a keyword group segmented according to each directory.

Next, multiple keyword groups 804, 805, in which a word distance with the specific keyword 801 belongs to a second category d2, are segmented into the same semantic depth level (Level 2) so that a second recommended keyword list presented in Level 2 can be constituted when a search for any one of the multiple recommended keywords presented in Level 1 is requested. Respective keyword groups included in the semantic depth category of Level 2 may be grouped into a group which satisfies a predetermined distance d12 with the keyword groups of Level 1. Similarly, the recommended keyword (21) 804 or the recommended keyword (2M) 805 belonging to Level 2 is grouped in a second group of the same semantic depth level as a keyword group segmented according to each directory.

Next, multiple keyword groups 806, 807, in which a word distance with the specific keyword 801 belongs to a third category d3, are segmented into the same semantic depth level (Level 3) so that a third recommended keyword list presented Level 3 can be constituted when a search for any one of the multiple recommended keywords presented Level 2 is requested. At this time, respective keyword groups included in the semantic depth category of Level 3 may be grouped into a group which satisfies a predetermined distance d23 with the keyword groups of Level 2. Similarly, the recommended keyword (31) 806 or the recommended keyword (3L) 807 belonging to Level 3 is grouped into a third group of the same semantic depth as a keyword group segmented according to each directory.

FIG. 9 shows one example of a form in which a recommended keyword service for each directory suggested by the keyword presenting system 10 according to the embodiment of the present invention is provided.

Referring to FIG. 9, the semantic depth engine 130 according to the embodiment of the present invention derives all keywords (including basic synonyms and extended synonyms) associated with the keyword 'wine' based on the keyword from the search database 140, the semantic depth database 150 and the dictionary database 160, thereby forming a keyword list. Furthermore, as a result of performing a directory grouping process using the aforesaid methods described in the sections regarding FIG. 4 with regard to the keyword list, the semantic depth engine may constitute and provide a search result screen 900 including a list of final keywords for each directory.

Thus, in a case where the keyword 'wine' is inputted in a search window 901 on a webpage, a first recommended keyword list 902 composed of multiple recommended keywords for each directory such as 'wine classification,' 'accompaniment for wine,' 'winery,' 'wine keeping,' 'wine festival,' 'wine testing' and the like belonging to the same semantic depth level is formed so as to be outputted on the search result screen 900. The respective recommended keywords exemplified on the first recommended keyword list 902 are segmented in detail into recommended keywords for subdirectories of an upper semantic depth level according to each semantic depth level so as to be gradationally provided.

FIG. 10 shows another example of a form, in which a recommended keyword service for each semantic depth is provided, suggested by the keyword presenting system according to the embodiment of the present invention.

Referring to FIG. 10(a), the semantic depth engine 130 according to the embodiment of the present invention may provide a first recommended keyword list 1002 composed of multiple recommended keywords for each upper directory based on the keyword 1001 'wedding' inputted in the search window.

For example, the keywords 'propose,' 'wedding expense,' 'wedding date,' 'wedding hall,' 'wedding present,' 'bridal shower,' and the like correspond to recommended keywords for each directory belonging to semantic depth Level 1. That is, a list of all keywords related to the wedding is provided in a 'recommended keyword' form so that search conditions can be variously provided so as to enable users to select keywords necessary according to each situation.

FIG. 10(b) shows one example of a second recommended keyword list 1004 of Level 2 of the semantic depth level related to a specific recommended keyword selected by a user from the first recommended keyword list 1002 of semantic depth Level 1 provided in (a).

For example, when a user selects the keyword 'wedding hall' from the first recommended keyword list 1002, the semantic depth engine 130 may provide the second recommended keyword list 1004 composed of recommended keywords such as 'recommendation for wedding hall,' 'expenses for wedding hall,' 'reservation for wedding hall' and the like which are related to the search keyword 1003 'wedding hall' on the assumption that the search keyword 1003 'wedding hall' is inputted in the search window. Similarly, the respective recommended keywords exemplified on the second recommended keyword list 1004 may be provided in a state of being segmented into recommended keywords for each directory belonging to one or more semantic depth levels in sub-levels.

FIG. 10(c) shows one example of a third recommended keyword list 1006 of semantic depth Level 3 related to the keyword 'recommendation for wedding hall' selected by the user from the second recommended keyword list 1004 provided in FIG. 10(b).

For example, when a user selects the keyword 'recommendation for wedding hall' from the second recommended keyword list 1004, the semantic depth engine 130 may form and provide the third recommended keyword list 1006 composed of recommended keywords such as 'Catholic church wedding,' 'outdoor wedding,' 'hotel wedding,' 'wedding hall' and the like which are grouped according to a place characteristic based on the keyword 'recommendation for wedding hall' on the assumption that the search keyword 1005 'recommendation for wedding hall' is inputted in the search window.

As described above, according to the keyword presenting system 10 according to the embodiment of the present invention, recommended keywords for each directory according to subjects related to a corresponding keyword are pre-provided based on initial search data inputted by a user, so that the user's search convenience and diversity of information gathering can be provided.

Although a preferred embodiment of the present invention has been described for illustrative purposes, those skilled in the art will appreciate that various modifications, additions and substitutions are possible, without departing from the scope and spirit of the invention as disclosed in the accompanying claims. Accordingly, the embodiments of the present invention described herein are merely representative for purposes of describing the technical ideas of the present invention and the technical ideas of the present invention should not be construed as limited to only the embodiments set forth herein. The protective scope of the present invention should be interpreted by the following claims and all technical ideas falling within the equivalent scope thereof should be interpreted to fall within the scope of rights of the present invention.

What is claimed is:

1. A keyword presenting system which presents multiple keywords associated with a keyword inputted by a client, the keyword presenting system comprising:
    a memory; and
    a processor connected to the memory configured to:
        connect with the client via a network;
        receive the keyword inputted from the client; and
        provide a search interface on a display of the client presenting multiple keywords in successively generated and displayed forms for each of at least first and second semantic depth levels, each form including an input window and a displayed list of multiple candidate keywords;
    a search database configured to store multiple search results and multiple candidate keywords presented in the search interface; and
    a semantic depth database configured to store a semantic depth structure representing a semantic distance between keywords according to each of the candidate keywords;
    wherein said providing a search interface comprises:
        deriving a first set of candidate keywords based on the search database with regard to the keyword inputted from the client;
        deriving a first set of associated keywords according to the first set of candidate keywords;
        forming a first set of recommended keyword groups for the first semantic depth level based on the first set of associated keywords using the semantic depth database;
        providing the first form on the display including the keyword inputted from the client in the input window and the first set of recommended keyword groups;
        receiving a second keyword inputted from the client, the second keyword being selected from among the first set of recommended keyword groups;
        deriving a second set of candidate keywords based on the search database with regard to the second keyword;
        deriving a second set of associated keywords according to each of the second set of candidate keywords;
        forming a second set of recommended keyword groups for the second semantic depth level based on the second set of associated keywords using the semantic depth database; and
        providing the second form on the display including the second keyword inputted from the client in the input window and the second set of recommended keyword groups as the multiple candidate keywords,
    wherein generating the second set of associated keywords comprises:
        generating basic synonyms of the second set of candidate keywords;
        analyzing morphemes of the second set of candidate keywords and the generated basic synonyms;
        removing a common postfix or a common suffix from the second set of candidate keywords and the generated basic synonyms to generate remaining words; and
    creating at least one extended synonym, from the at least one basic synonym and the second set of candidate keywords by applying a character string matching technique to the remaining words.

2. The system of claim 1, wherein the processor is further configured to:
    derive the multiple candidate keywords associated with the keyword inputted from the client based on the search database; and
    provide recommended keywords included in the recommended keyword lists for the respective multiple semantic depth levels based on the semantic depth database according to a predetermined grouping algorithm with regard to the candidate keywords derived by the candidate keyword providing unit.

3. The system of claim 2, wherein said providing recommended keywords comprises grouping the recommended keyword groups according to corresponding multiple directories by carrying out a process for clustering the multiple associated keywords derived by the candidate keyword providing unit with similar keywords for each of the multiple directories.

4. The system of claim 3, wherein said providing recommended keywords uses at least one of a hierarchical clustering method based on calculating a semantic-based character string distance with regard to the multiple associated keywords, and an affix clustering method using postfixes or prefixes of the multiple associated keywords.

5. The system of claim 3, wherein said providing recommended keywords comprises classifying each of multiple keyword groups for each of multiple depth levels in the semantic depth structure according to the keyword inputted from the client, thereby constituting the recommended keyword lists according to classifying results.

6. The system of claim 1, wherein the processor saves the semantic depth tree structure for corresponding to the keyword inputted from the client in the semantic depth database, thereby updating the semantic depth database.

7. The system of claim 1, further comprising:
a content database configured to save related content data according to multiple recommended keywords for each of multiple directories; and
a search engine configured to search one or more kinds of content regarding a specific keyword inputted from the client based on the content database and to provide the searched content via the search interface.

8. A keyword presenting method for presenting recommended keywords associated with a keyword inputted by a client, the method comprising:
(a) receiving information on the keyword inputted from the client over a network via a search interface provided by an interface unit;
(b) providing, on the display of the client via the search interface, multiple keywords in successively generated and displayed forms for each of at least first and second semantic depth levels of a semantic depth structure representing a semantic distance between keywords, each form including an input window and a displayed list of multiple candidate keywords;
wherein said providing multiple keywords comprises:
deriving, by a processor, a first set of candidate keywords associated with the keyword inputted from the client based on a search database;
deriving, by the processor, a first set of associated keywords according to the first set of candidate keywords;
forming, by the processor, a first set of recommended keyword groups for the first semantic depth level based on the first set of associated keywords using a semantic depth database;
providing the first form on the display including the keyword inputted from the client in the input window and the first set of recommended keyword groups;
receiving a second keyword inputted from the client, the second keyword being selected from among the first set of recommended keyword groups;

deriving, by the processor, a second set of candidate keywords based on the search database with regard to the second keyword;
deriving, by the processor, a second set of associated keywords according to each of the second set of candidate keywords;
forming, by the processor, a second set of recommended keyword groups for the second semantic depth level based on the second set of associated keywords using the semantic depth database; and
providing the second form on the display including the second keyword inputted from the client in the input window and the second set of recommended keyword groups as the multiple candidate keywords,
wherein generating the second set of associated keywords comprises:
generating basic synonyms of the second set of candidate keywords;
analyzing morphemes of the second set of candidate keywords and the generated basic synonyms;
removing a common postfix or a common suffix from the second set of candidate keywords and the generated basic synonyms to generate remaining words; and
creating at least one extended synonym from the at least one basic synonym and the second set of candidate keywords by applying a character string matching technique to remaining words.

9. The method of claim 8, wherein the step (b) further comprises:
analyzing morphemes of the candidate keywords upon deriving the candidate keywords;
performing keyword counting for each morpheme according to analysis results of the morphemes;
deriving the at least one basic synonym with regard to the morphemes beyond a predetermined standard value based on counting results for each of the morphemes; and
creating the at least one extended synonym using the morphemes constituting the candidate keywords and a character string matching technique between the basic synonyms.

10. The method of claim 8, wherein said step (b) further comprises:
analyzing morphemes of the recommended keywords and at least one basic synonym related to the recommended keywords upon the deriving of the recommended keywords;
removing a common postfix or a common suffix from the recommended keywords and the at least one basic synonym according to morpheme analysis results; and
creating the at least one extended synonym using the string matching technique with regard to remaining words after the removing of the common postfix or the common suffix from the recommended keywords and the at least one basic synonym to increase the number of the recommended keywords.

11. The method of claim 8, wherein the step (c) further comprises:
analyzing morphemes of the recommended keywords upon the deriving of the recommended keywords;
performing keyword counting for each morpheme according to morpheme analysis results;
deriving the at least one basic synonym with regard to the morphemes beyond a predetermined standard value based on counting results for each of the morphemes; and creating the at least one extended synonym using the morphemes constituting the recommended keywords and the string matching technique to increase the number of the recommended keywords.

12. The method of claim 8, wherein the step (b) comprises:

providing an associated keyword list containing the multiple associated keywords derived according to each of the candidate keywords based on the semantic depth database;

performing a primary keyword grouping process using a hierarchical clustering technique based on a character string distance between keywords with regard to the associated keyword list;

performing a secondary keyword grouping process using an affix clustering technique based on a suffix or a postfix of the keywords with regard to the associated keyword list; and performing a third keyword grouping process for segmenting remaining keywords after the primary keyword grouping process and the secondary keyword grouping process, into a same group.

13. The method of claim 12, wherein said step (b) further comprises:

classifying each of multiple keyword groups for each of multiple semantic depth levels in the semantic depth structure according to the keyword inputted from the client; and presenting the recommend keyword lists for each semantic depth level by using, as the recommended keywords, representative keywords representing each group from the multiple keyword groups belonging to the each semantic depth level.

14. The method of claim 12, wherein the primary keyword grouping process comprises:

checking meanings representing a combination between associated keywords to replace corresponding keywords with codes for each meaning according to a predetermined condition;

calculating an editing distance between the associated keywords by applying a predetermined similarity calculation function with regard to the keywords replaced with the codes and measuring a similarity value; and grouping the keywords into a same directory group when the similarity value is beyond a predetermined standard value according to a result of the similarity measurement.

15. The method of claim 12, wherein the secondary keyword grouping process comprises grouping the keywords having the same postfix information or the same suffix information in the associated keyword list into a same directory group.

16. The method of claim 8, further comprising:

(c) gradationally providing the recommended keyword list from an upper directory to a subdirectory via the search interface according to a user selection signal inputted from the client; and (d) searching one or more kinds of content regarding a specific recommend keyword inputted from the client based on the content database and providing the searched content to the client via the search interface.

17. The method of claim 9, wherein the step (b) further comprises deriving the multiple associated keywords from the semantic depth database based on the candidate keywords, the at least one basic synonym and the at least one extended synonym.

* * * * *